(12) United States Patent
Suzuki et al.

(10) Patent No.: US 8,926,774 B2
(45) Date of Patent: Jan. 6, 2015

(54) METHOD FOR MANUFACTURING A PNEUMATIC TIRE

(75) Inventors: Masaru Suzuki, Hyoue Hachioji (JP); Takashi Nishiyama, Kodaira (JP); Masami Adachi, Tokorozawa (JP); Daisaku Takabayashi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 180 days.

(21) Appl. No.: 13/392,462

(22) PCT Filed: Aug. 6, 2010

(86) PCT No.: PCT/JP2010/004983
§ 371 (c)(1),
(2), (4) Date: Feb. 24, 2012

(87) PCT Pub. No.: WO2011/024393
PCT Pub. Date: Mar. 3, 2011

(65) Prior Publication Data
US 2012/0160396 A1  Jun. 28, 2012

(30) Foreign Application Priority Data
Aug. 26, 2009 (JP) ................................ 2009-195904

(51) Int. Cl.
B29D 30/30 (2006.01)

(52) U.S. Cl.
CPC .................................. B29D 30/3007 (2013.01)
USPC ........................................ 156/123; 156/406.4

(58) Field of Classification Search
USPC ................... 156/123, 133, 134, 405.1, 406.4; 152/510, DIG. 16
See application file for complete search history.

(56) References Cited

U.S. PATENT DOCUMENTS 4,596,617 A * 6/1986 Ishii ........................... 156/130.3
4,738,743 A * 4/1988 Satoh et al. ................. 156/405.1
(Continued)

FOREIGN PATENT DOCUMENTS

EP  0 714 758 A2  6/1996
EP  2 045 103 A1  4/2009
(Continued)

OTHER PUBLICATIONS

Japanese Office Action issued in Japanese Application No. 2009-195904 dated May 14, 2013 English translation.
(Continued)

Primary Examiner — Geoffrey L Knable
(74) Attorney, Agent, or Firm — Sughrue Mion, PLLC

(57) ABSTRACT

Provided is a method for manufacturing a pneumatic tire capable of easily and appropriately winding a sheet lamination body formed by a resin film and an unvulcanized rubber sheet around a shaping drum. In the method for manufacturing a pneumatic tire including conveying a sheet lamination body 1 to a shaping drum 11, and winding the conveyed sheet lamination body 1 in a position that a resin film 3 is located on the inner side while causing an outer peripheral surface of the shaping drum 11 to retain the conveyed sheet lamination body 1, a resin film protrusion portion 8 is formed by making a leading edge 4 of the resin film 3 protrude toward a downstream side in a conveying direction A than the leading edge 5 of the unvulcanized rubber sheet 2 as viewed in the conveying direction A at the time of attaching the resin film 3 on a surface of an unvulcanized rubber sheet 2, and the outer peripheral surface of the shaping drum 11 is caused to retain in advance the resin film protrusion portion 8 to wind the sheet lamination body 1 on the outer peripheral surface of the shaping drum 11.

3 Claims, 5 Drawing Sheets

(56) References Cited

U.S. PATENT DOCUMENTS

| | | | |
|---|---|---|---|
| 5,273,601 A * | 12/1993 | Sergel et al. | 156/133 |
| 5,679,205 A * | 10/1997 | Marks et al. | 156/406.6 |
| 5,938,869 A * | 8/1999 | Kaido et al. | 152/510 |
| 2009/0131592 A1 | 5/2009 | Sakai et al. | |
| 2009/0173431 A1 | 7/2009 | Hashimura et al. | |
| 2009/0293267 A1* | 12/2009 | Slots et al. | 29/802 |
| 2011/0036485 A1* | 2/2011 | Rey et al. | 156/117 |

FOREIGN PATENT DOCUMENTS

| | | | |
|---|---|---|---|
| GB | 1045073 A | | 10/1966 |
| JP | 04-101835 A | | 4/1992 |
| JP | 04-118302 A | * | 4/1992 |
| JP | 09-240893 | | 9/1997 |
| JP | 2003-200706 A | | 7/2003 |
| JP | 2006-130735 A | | 5/2006 |
| JP | 2007-261137 A | | 10/2007 |
| JP | 2007313776 A | | 12/2007 |
| JP | 2008-221638 A | | 9/2008 |
| JP | 2009-208444 A | * | 9/2009 |
| WO | 96/30221 A1 | | 10/1996 |
| WO | 2007/043489 A1 | | 4/2007 |

OTHER PUBLICATIONS

Extended European Search Report dated Dec. 20, 2012 issued in European Patent Application No. 10811452.1.

International Search Report of PCT/JP2010/004983, dated Oct. 5, 2010.

European Office Action issued Feb. 5, 2014 in European Patent Application No. 10811452.1.

Chinese Office Action issued Dec. 24, 2013 in Chinese Patent Application No. 201080044053.3.

Chinese Office Action issued Jul. 15, 2014 in Chinese Patent Application No. 201080044053.3.

\* cited by examiner (a)

(b)

METHOD FOR MANUFACTURING A PNEUMATIC TIRE

CROSS REFERENCE TO RELATED APPLICATIONS

This application is a National Stage of International Application No. PCT/JP2010/004983 filed Aug. 6, 2010, claiming priority based on Japanese Patent Application No. 2009-195904 filed Aug. 26, 2009 the contents of all of which are incorporated herein by reference in their entirety.

TECHNICAL FIELD

The present invention relates to a method for manufacturing a pneumatic tire including conveying, to a shaping drum, a sheet lamination body formed by laminating an unvulcanized rubber sheet and a resin film having a gas barrier property, and winding the conveyed sheet lamination body in a position that the resin film is located on the inner side while causing an outer peripheral surface of the shaping drum to retain the conveyed sheet lamination body. In particular, the present invention discloses a technique for easily and appropriately winding the sheet lamination body on the shaping drum.

RELATED ART

On the inner surface of a pneumatic tire, an inner liner made of a rubber having a low gas permeation such as a butyl rubber is provided to prevent the air leakage and keep the pneumatic pressure of the tire constant. In recent years, for the purpose of reducing the weight of the tire, there is proposed a technique of forming the inner liner with a thermoplastic resin film having a gas barrier property as disclosed, for example, in Patent Document 1.

Incidentally, in the case where a base material of the inner liner is formed by winding a band-shaped flat resin film around an outer peripheral surface of a shaping drum, a single resin film may be wound around the shaping drum. However, since the resin film has a thin thickness and a low rigidity, formation defects such as wrinkles and curling are more likely to occur. In order to solve the problem described above, there is proposed a technique for improving the handleability of a resin film 2 by layering the resin film 3 to an unvulcanized rubber sheet 2 having a higher rigidity than that of the resin film 3 to form a sheet lamination body 100, conveying the formed sheet lamination body 100 to a shaping drum 11, and winding the sheet lamination body 100 while sucking and retaining a winding-starting end of the sheet lamination body 100, for example, with a sucking hole 19 provided on the outer peripheral surface of the shaping drum 11, as illustrated in FIG. 5(a).

RELATED ART DOCUMENT

Patent Document

Patent Document 1: WO 96/30221

DISCLOSURE OF THE INVENTION

Problems to be Solved by the Invention

However, the sheet lamination body 100 formed by the resin film 3 and the unvulcanized rubber sheet 2 has a heavy weight. Thus, a suction force is not sufficient to suck and retain the winding-starting end of the sheet lamination body 100 with the sucking hole 19 of the shaping drum 11 at the start of winding of the sheet lamination body 100 around the shaping drum 11 with the resin film 3 being placed on the inner side. This leads to a problem of defects at the time of winding such as falling of the winding-starting end of the sheet lamination body 100 and winding of the sheet lamination body 100 on the shaping drum 11 in a meandering manner as illustrated in FIG. 5(b). Further, in the case where the suction force of the sucking hole 19 is enhanced, the resin film 3 is drawn into the sucking hole 19, causing the wrinkles and breakage of the resin film 3. Further, in the sheet lamination body 100 as described above, the rigidity and the amount of shrinks are different between the resin film 3 and the unvulcanized rubber sheet 2. Thus, as illustrated in a partially enlarged view in FIG. 5(a), the winding-starting end of the sheet lamination body 100 largely rises from a conveying surface of a supplying conveyor 12, and at the time of starting the winding to the shaping drum 11, a position of the winding starting end of the sheet lamination body 100 is deviated from the sucking hole 19 of the shaping drum 11 at which this winding starting end has to be placed.

In view of the circumstances described above, an object of the present invention is to solve the problems described above, and to provide a method for manufacturing a pneumatic tire capable of easily and appropriately winding a sheet lamination body formed by a resin film serving as a base material of an inner liner and an unvulcanized rubber sheet around a shaping drum by reliably positioning and retaining a winding-starting end of the sheet lamination body at a predetermined position on an outer peripheral surface of the shaping drum at the starting of winding the sheet lamination body around the outer peripheral surface of the shaping drum in a state where the resin film is placed on the inner side.

Means for Solving the Problem

To solve the problems described above, a method for manufacturing a pneumatic tire according to the present invention provides a method for manufacturing a pneumatic tire including: conveying, to a shaping drum, a sheet lamination body formed by laminating an unvulcanized rubber sheet and a resin film having a gas barrier property, and winding the conveyed sheet lamination body in a position that the resin film is located on the inner side while causing an outer peripheral surface of the shaping drum to retain the conveyed sheet lamination body, in which, at the time of attaching the resin film on a surface of the unvulcanized rubber sheet, a resin film protrusion portion is formed by making a leading edge of the resin film protrude toward a downstream side in a conveying direction than a leading edge of the unvulcanized rubber sheet as viewed in the conveying direction, and the outer peripheral surface of the shaping drum is caused to retain in advance the resin film protrusion portion to wind the sheet lamination body on the outer peripheral surface of the shaping drum.

According the method for manufacturing a pneumatic tire having the configuration as described above, the resin film protrusion portion formed only by the resin film, which has a significantly light weight as compared with the unvulcanized rubber sheet, can be retained in advance at the time of causing the outer peripheral surface of the shaping drum to retain the winding-starting end of the sheet lamination body. This prevents the sheet lamination body from being wound on the shaping drum in a meandering manner or from dropping from the shaping drum due to the lack of the retaining force, so that the sheet lamination body can be appropriately wound in the easy manner on the outer peripheral surface of the shaping drum. Further, in the case where sucking holes for drawing air is provided to the shaping drum and the sheet lamination body is retained with the sucking holes, it is not necessary to increase the sucking force more than necessary, eliminating the possibility of the resin film being drawn into the sucking holes. Yet further, the winding-starting end of the sheet lamination body is configured only by the resin film. Thus, the winding-starting end does not rise from the conveying surface, so that the winding-starting end of the sheet lamination body can be correctly positioned at a predetermined position of the shaping drum.

It should be noted that, in the method for manufacturing a pneumatic tire according to the present invention, it is preferable to employ the unvulcanized rubber sheet and the resin film each having an equal length along the conveying direction, and positionally shift the leading edge of the resin film to the downstream side in the conveying direction with respect to the leading edge of the unvulcanized rubber sheet as viewed in the conveying direction while positionally shifting a trailing edge of the resin film to the downstream side in the conveying direction with respect to a trailing edge of the unvulcanized rubber sheet to form, in addition to the resin film protrusion portion, an unvulcanized rubber sheet protrusion portion in which the trailing edge of the unvulcanized rubber sheet protrudes toward an upstream side in the conveying direction than the trailing edge of the resin film.

Further, in the method for manufacturing a pneumatic tire according to the present invention, it is preferable to bring a winding-starting end of the sheet lamination body close to the shaping drum before the outer peripheral surface of the shaping drum is caused to retain in advance the resin film protrusion portion.

Yet further, in the method for manufacturing a pneumatic tire according to the present invention, it is preferable to move the sheet lamination body toward the upstream side in the conveying direction after the outer peripheral surface of the shaping drum is caused to retain in advance the resin film protrusion portion. Yet further, it is preferable to set a conveying speed of the sheet lamination body slower than a speed at which the sheet lamination body is wound around the shaping drum from a time when the outer peripheral surface of the shaping drum is caused to retain in advance the resin film protrusion portion to a time when the leading edge of the unvulcanized rubber sheet reaches the shaping drum.

Effect of the Invention

According to the present invention, it is possible to appropriately and easily wind the sheet lamination body around the shaping drum, by reliably positioning and retaining the winding-starting end of the sheet lamination body at the predetermined position on the outer peripheral surface of the shaping drum at the starting of winding the sheet lamination body formed by the resin film serving as the base material of the inner liner and the unvulcanized rubber sheet on the outer peripheral surface of the shaping drum in a manner that the resin film is located on the inner surface side.

BEST MODE FOR CARRYING OUT THE INVENTION

Figure 1:
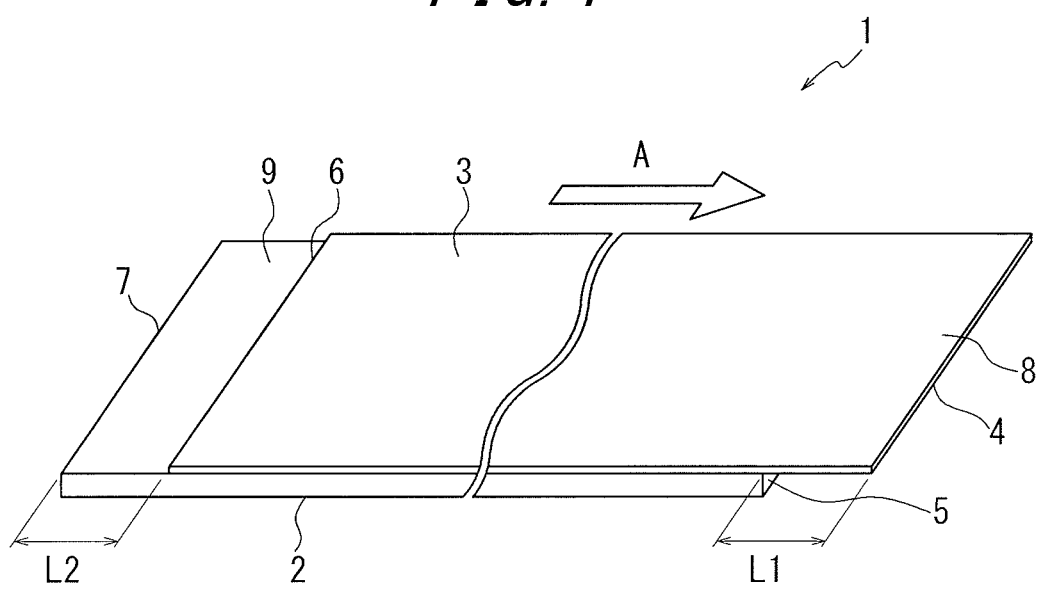
FIG. 1 is a perspective view illustrating, as an example, a sheet lamination body applicable to implementation of the present invention.
Figure 2:
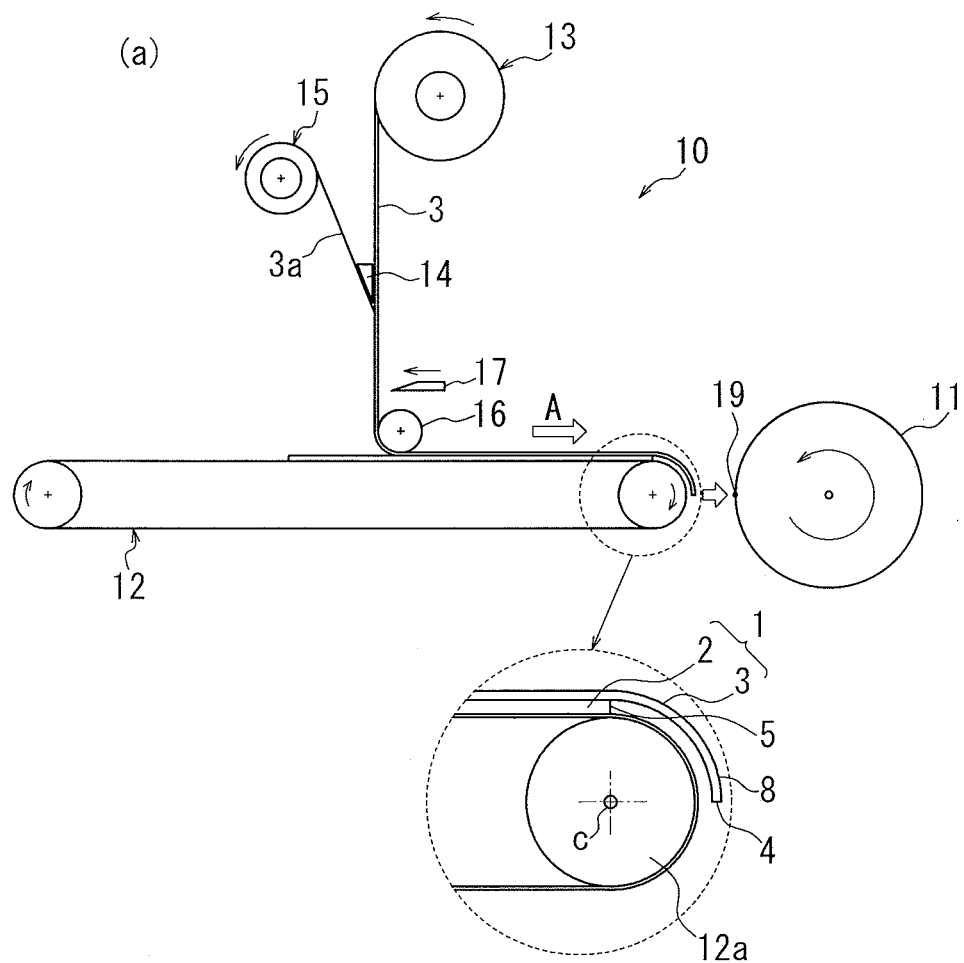
FIG. 2(a) is a side view illustrating a main portion of a device for manufacturing a tire, the device being applicable to implementation of the present invention.
FIG. 2(b) is a perspective view illustrating a shaping drum.
Figure 2:
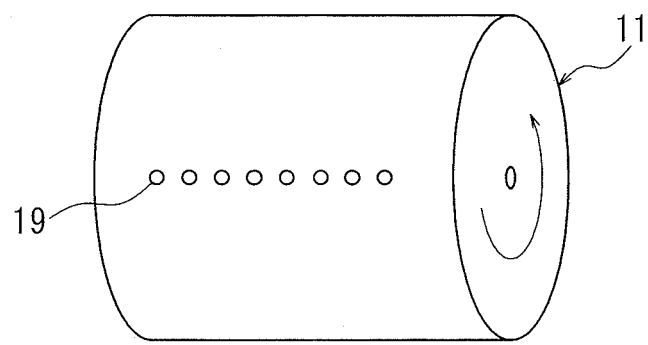
Figure 3:
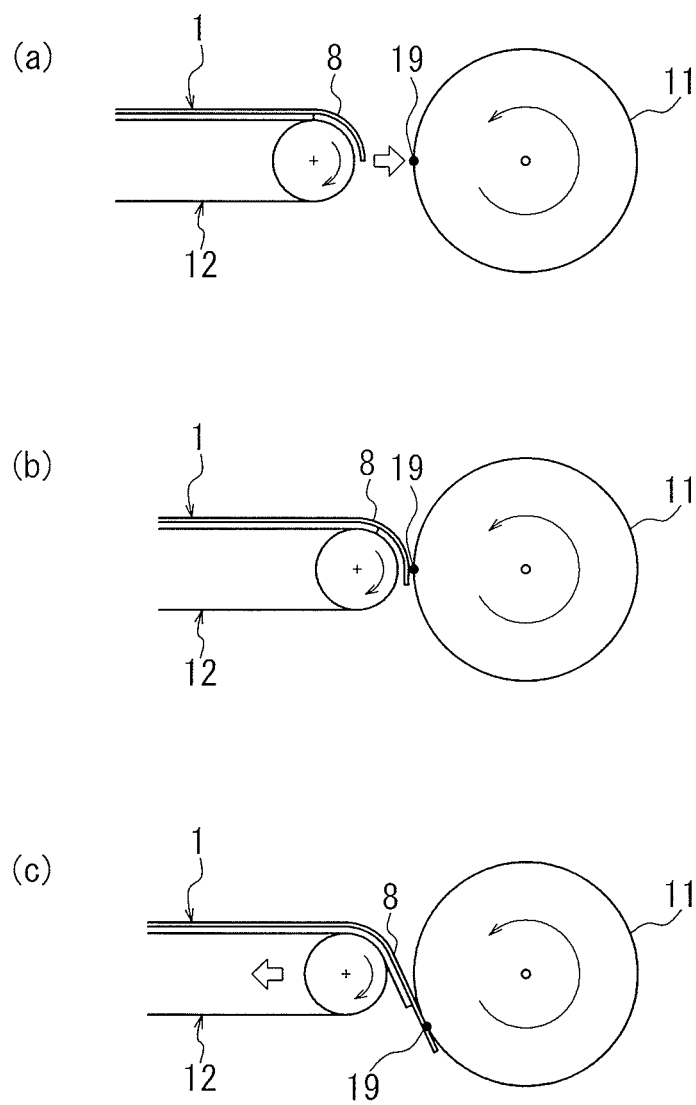
FIG. 3 is a process diagram for explaining an embodiment of the present invention.

Hereinbelow, an embodiment of a method for manufacturing a pneumatic tire according to the present invention will be described with reference to FIG. 1 through FIG. 4. FIG. 1 is a perspective view illustrating, as an example, a sheet lamination body (hereinafter, referred to as "lamination body") applicable to implementation of the present invention. FIG. 2(a) is a side view illustrating a main portion of a device for manufacturing a tire applicable to implementation of the present invention, and FIG. 2(b) is a perspective view illustrating a shaping drum.

As illustrated in FIG. 1, a lamination body 1 is formed by attaching a thermoplastic resin film 3 on a surface of an unvulcanized rubber sheet 2 that may be formed, for example, by a rubber sheet for an inner liner, a rubber sheet for a squeegee rubber, a rubber sheet having a carcass ply cord embedded therein. The unvulcanized rubber sheet 2 is formed by a butyl rubber in this specification. The resin film 3 has a gas barrier property, and serves as a base material for an inner liner. The resin film 3 may be a single layer, or may be a layered structure, having a thickness in the range of 10 to 500 μm. In the lamination body 1 illustrated in the drawing, the widths of the resin film 3 and the unvulcanized rubber sheet 2 are aligned to each other, and the resin film 3 and the unvulcanized rubber sheet 2 are adhered through, for example, an adhesive such that end edge positions 4, 5, 6 and 7 of the resin film 3 and the unvulcanized rubber sheet 2 are positionally shifted to each other in the longitudinal direction. More specifically, as viewed in a conveying direction A of the lamination body 1, a leading edge 4 of the resin film 3 is disposed so as to be positionally shifted to the downstream side in the conveying direction A than a leading edge 5 of the unvulcanized rubber sheet 2 to form a resin film protrusion portion 8 of the lamination body 1, the resin film protrusion portion 8 protruding by a predetermined length L1 toward the downstream side in the conveying direction A. Further, the lengths of the resin film 3 and the unvulcanized rubber sheet 2 are equal along the conveying direction A, and an unvulcanized rubber sheet protrusion portion 9 is formed on the opposite side of the resin film protrusion portion 8 with respect to the conveying direction A such that the trailing edge 7 of the unvulcanized rubber sheet 2 protrudes from the trailing edge 6 of the resin film 3 by a predetermined length L2 toward the upstream side in the conveying direction A. The lengths L1 and L2 are equal. Note that, in some cases, it may be possible to employ a configuration in which the widths of the resin film 3 and the unvulcanized rubber sheet 2 are not aligned to each other.

As a device for forming the lamination body 1 as described above and shaping the lamination body 1 into a cylindrical shape, it may be possible to use a tire manufacturing device 10 illustrated as an example in FIG. 2. The tire manufacturing device 10 illustrated in the drawing includes a shaping drum 11, a supplying conveyor 12, a resin film supplying drum 13, a lining sheet removing member 14, a lining sheet winding drum 15, a pressing roller 16, and a film cutting means 17.

The shaping drum 11 has an outer peripheral surface provided with plural sucking holes 19 serving as a retaining means for retaining the lamination body 1 by sucking it. By drawing air through the sucking holes 19, the winding-starting end (the resin film protrusion portion 8 in this embodiment) of the lamination body 1 is sucked and retained in advance on the outer peripheral surface of the shaping drum. It should be noted that, at the time of retaining the winding-starting end of the lamination body 1 on the shaping drum 11, it may be possible to dispose an adhesive rubber member on the shaping drum 11.

The supplying conveyor 12 is disposed in front of the shaping drum 11, conveys the lamination body 1 in a flat position with the conveying surface thereof, and transfers the lamination body 1 to the shaping drum 11. The supplying conveyor 12 is configured so as to be able to deform in the approaching and separating directions with respect to the shaping drum 11.

The resin film supplying drum 13 is disposed above the conveying surface of the supplying conveyor 12, and supplies the resin film 3 to the unvulcanized rubber sheet 2 conveyed by the supplying conveyor 12. It should be noted that the resin film 3 is lined with a lining sheet 3a for reinforcing the resin film 3. The lining sheet 3a is removed by the lining sheet removing member 14 before the attachment to the unvulcanized rubber sheet 2 on the supplying conveyor 12. The lining sheet winding drum 15 winds the lining sheet 3a removed from the resin film 3.

The pressing roller 16 presses the resin film 3, from which the lining sheet 3a has been removed, on the surface of the unvulcanized rubber sheet 2 to causes the unvulcanized rubber sheet 2 and the resin film 3 to adhere to each other. The film cutting means 17 is provided to cut the resin film 3 into a predetermined length, and may be formed by a knife edge or shearing blade.

A description will be made of a method for forming the lamination body 1 by using the device 10 as described above, and a method for attaching the formed lamination body 1 to the outer peripheral surface of the shaping drum 11. First, the resin film 3 is fed from the resin film supplying drum 13 toward the conveying surface of the supplying conveyor 12. At this time, the lining sheet 3a of the resin film 3 is removed, and is wound by the lining sheet winding drum 15. Then, at the same timing as the feeding of the resin film 3, the same supplying conveyor 12 conveys the unvulcanized rubber sheet 2 in the flat position, and the resin film 3 is sequentially adhered to the surface of the unvulcanized rubber sheet 2 with the pressing operation of the pressing roller 16 in the state where the leading edges 4 and 5 of the resin film 3 and the unvulcanized rubber sheet 2 are adjusted in a predetermined manner.

With this manner, as illustrated in FIG. 1, the resin film protrusion portion 8 is formed in the lamination body 1 such that the leading edge 4 of the resin film 3 protrudes toward the downstream side in the conveying direction A than the leading edge 5 of the unvulcanized rubber sheet 2 as viewed in the conveying direction A. At this time, it is preferable that, as illustrated in an enlarged manner in FIG. 2, the protruding length L1 of the resin film protrusion portion 8 is set to ¼ or more of the outer peripheral length of a leading edge roller 12a serving as a transferring portion of the lamination body 1 by the supplying conveyor 12. More specifically, it is preferable that, when the leading edge 5 of the unvulcanized rubber sheet 2 reaches a position of a vertical line passing through an axis c of the leading edge roller 12a, the leading edge 4 of the resin film 3 is positioned lower than a position of a horizontal line passing through the axis c. With this configuration, it is possible to reliably and easily transfer the winding-starting end of the lamination body 1 to the shaping drum 11.

Then, the resin film 3 to be attached to the unvulcanized rubber sheet 2 is cut by the film cutting means 17 so as to have a predetermined length in the conveying direction A, more specifically, so as to form the unvulcanized rubber sheet protrusion portion 9 in which the trailing edge 7 of the unvulcanized rubber sheet 2 protrudes from the trailing edge 6 of the resin film 3 toward the upstream side in the conveying direction A. At the timing of the cutting, the supplying conveyor 12 is moved toward the downstream side in the conveying direction A while operating, and is displaced so as to be sufficiently close to the shaping drum 11, as illustrated in FIG. 3(a). With this operation, as illustrated in FIG. 3(b), the resin film protrusion portion 8 serving as the winding-starting end of the lamination body 1 is sucked and retained in advance on the outer peripheral surface of the shaping drum 11 by the sucking force of the sucking holes 19 of the shaping drum 11.

Then, at the timing when the resin film protrusion portion 8 is sucked in advance with the sucking holes 19 of the shaping drum 11, the supplying conveyor 12 is moved so as to be slightly spaced from the shaping drum 11 while operating as illustrated in FIG. 3(c). With this operation, it is possible to apply a constant tension to the resin film protrusion portion 8, whereby it is possible to adhere to the outer peripheral surface of the shaping drum 11 without causing the wrinkles and the like of the resin film protrusion portion 8. After this, the shaping drum 11 is rotated at a peripheral velocity equal to the supplying conveyor 12 in a state where the shaping drum 11 is spaced from the supplying conveyor 12. With this operation, it is possible to supply the lamination body 1 on the supplying conveyor 12 to the shaping drum 11, and wind the lamination body 1 on the outer peripheral surface of the shaping drum 11 in a position where the resin film 3 is located on the inner side.

It should be noted that it may be possible to set the conveying speed of the supplying conveyor 12 slightly slower than the winding speed of the lamination body 1 to the shaping drum 11 from the time when the resin film 3 is sucked in advance by the sucking holes 19 of the shaping drum 11 to the time when the leading edge 5 of the unvulcanized rubber sheet 2 reaches the shaping drum 11, and to apply a tension to the resin film protrusion portion 8, in place of the above-described manner in which the supplying conveyor 12 is displaced so as to be spaced from the shaping drum 11 at the timing when the resin film protrusion portion 8 is sucked in advance with the sucking holes 19 of the shaping drum 11 as illustrated in FIG. 3(c).

Figure 4:
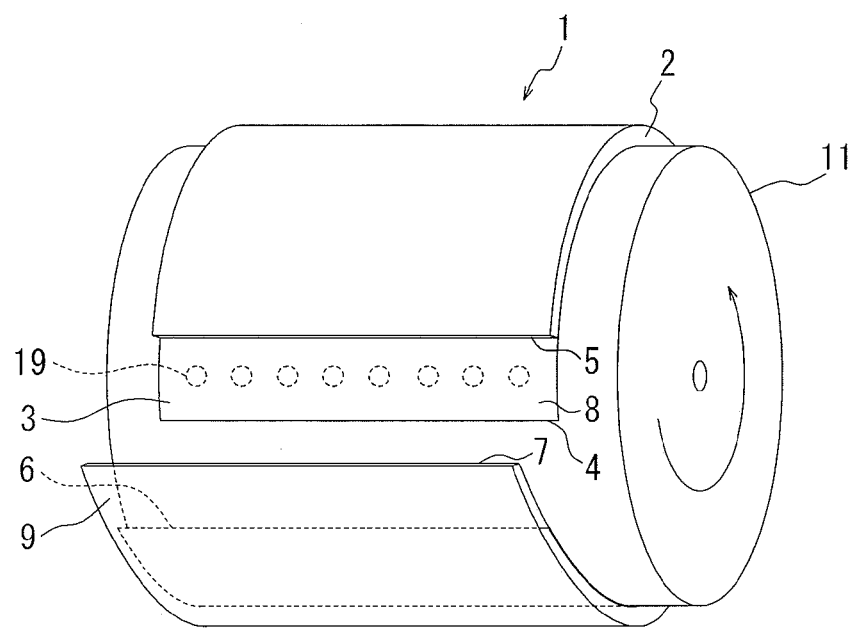
FIG. 4 is a process diagram for explaining an embodiment of the present invention.
Figure 4:
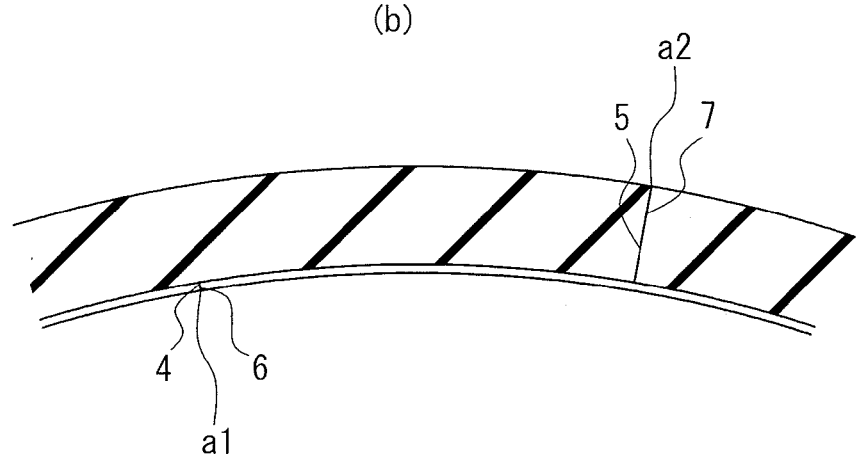
Figure 5:
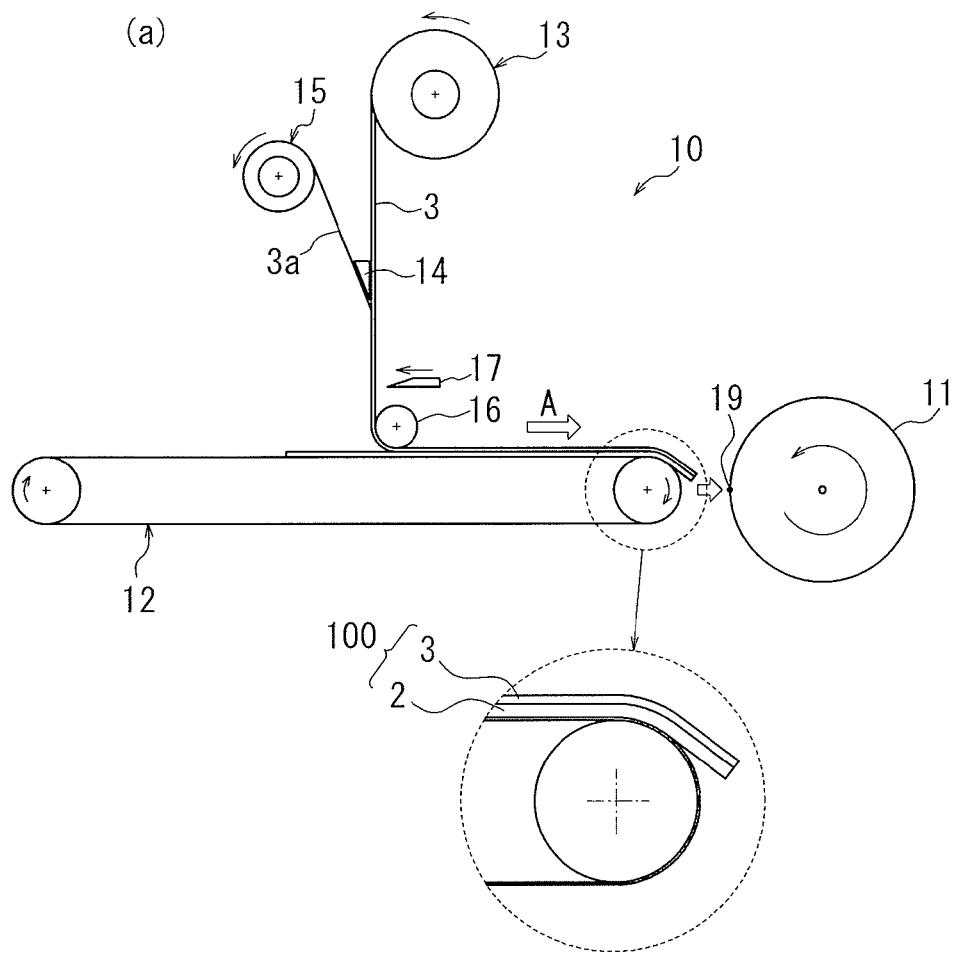
FIG. 5 is a diagram illustrating a conventional method for manufacturing a pneumatic tire.
Figure 5:
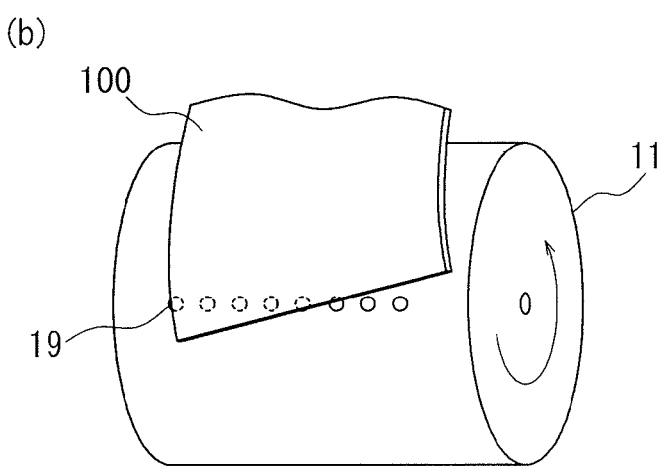

As described above, the lamination body 1 is wound around the outer peripheral surface of the shaping drum 11 for one circle. As illustrated in FIG. 4, at the end of the winding, the leading edge 4 and the trailing edge 6 of the resin film 3 are abutted to and joined to each other, and the leading edge 5 and the trailing edge 7 of the unvulcanized rubber sheet 2 are abutted to and joined to each other. With this configuration, the positions of a joining portion a1 of the resin film 3 and a joining portion a2 of the unvulcanized rubber sheet 2 are positionally shifted in the circumferential direction, whereby the air tightness of the product tire can be enhanced. Note that, although not illustrated, these end edges may be joined in a manner that they are overlapped vertically in the radial direction at the time of joining the leading edge 4 and the trailing edge 6 of the resin film 3, and the leading edge 5 and the trailing edge 7 of the unvulcanized rubber sheet 2. With this configuration, the air tightness of the product tire can be further enhanced.

It should be noted that steps thereafter are performed in a similar manner to those of the conventional technique. Thus, the steps thereafter will be described briefly. On the shaping drum 11, a carcass ply is wound around the lamination body 1, and a bead core and a stiffener or bead filler are attached on both end portions of the carcass ply.

Then, both end portions of the carcass ply are turned up inward, and a side tread is wound. After this, the tire is transferred to the other shaping drum (second drum), and air is applied in the tire. Both of the end portions of the carcass ply are brought closer to each other, and at the central portion thereof, a belt and a tread are wound, thereby obtaining a raw tire. Then, the thus obtained raw tire is attached to a vulcanization mold as is the case with the conventional technique, and is subjected to vulcanization at a predetermined temperature under a predetermined pressure, thereby obtaining the product tire.

According to the method for manufacturing the pneumatic tire having the configuration described above, the resin film protrusion portion 8 formed only by the resin film 3, which has a significantly light weight as compared with the unvulcanized rubber sheet 2, can be reliably sucked in advance with the sucking holes 19 at the time of sucking and retaining the winding-starting end of the lamination body 1 with the sucking holes 19 of the shaping drum 11. This prevents the lamination body 1 from being wound on the shaping drum 11 in a meandering manner, or from dropping from the shaping drum 11 due to the lack of the sucking force of the sucking holes 19, so that the lamination body 1 can be appropriately wound in the easy manner on the outer peripheral surface of the shaping drum 11. Further, it is not necessary to increase the sucking force of the sucking holes 19 more than necessary, which eliminates the possibility of the resin film 3 being drawn into the sucking holes 19. Yet further, the winding-starting end of the lamination body 1 is formed only by the resin film 3, which prevents this winding-starting end from rising from the conveying surface of the supplying conveyor 12. This makes it possible to correctly position the winding-starting end of the lamination body 1 at a predetermined position of the shaping drum 11.

According to the method for manufacturing the pneumatic tire of this embodiment, the unvulcanized rubber sheet 2 and the resin film 3 each having the same length along the conveying direction A are employed, and the leading edge 4 of the resin film 3 is positionally shifted to the downstream side in the conveying direction A with respect to the leading edge 5 of the unvulcanized rubber sheet 2 while the trailing edge 6 of the resin film 3 is positionally shifted to the downstream side in the conveying direction with respect to the trailing edge 7 of the unvulcanized rubber sheet 2 as viewed in the conveying direction A, thereby, in addition to the resin film protrusion portion 8, forming, in the lamination body 1, the unvulcanized rubber sheet protrusion portion 9 in which the trailing edge 7 of the unvulcanized rubber sheet 2 protrudes toward the upstream side in the conveying direction A than the trailing edge 6 of the resin film 3. With this configuration, it is possible to make the circumferential positions different between the joining portional of the resin film 3 and the joining portion a2 of the unvulcanized rubber sheet 2 at the winding-end of the lamination body 1 to the shaping drum 11, whereby the air tightness of the product tire can be enhanced.

According to the method for manufacturing the pneumatic tire of this embodiment, before the resin film protrusion portion 8 is sucked in advance with the sucking holes 19 of the shaping drum 11, the supplying conveyor 12 is moved so as to be close to the shaping drum 11, and the resin film protrusion portion 8 of the lamination body 1 is brought closer to the sucking holes 19 of the shaping drum 11. With this configuration, the winding-starting end of the lamination body 1 can be reliably guided to the sucking holes 19 of the shaping drum 11, whereby the winding-starting end of the lamination body 1 can be reliably transferred to the shaping drum 11.

According to the method for manufacturing the pneumatic tire of this embodiment, the lamination body 1 is moved to the upstream side in the conveying direction A at the timing of sucking the resin film protrusion portion 8 in advance with the sucking holes 19 of the shaping drum 11. Thus, the tension is applied to the resin film protrusion portion 8 of the lamination body 1, which makes it possible to prevent the occurrence of the winkles on the resin film protrusion portion 8 at the time of winding, or to extend and remove the winkles even if the winkles occur.

Alternatively, it may be possible to set the conveying speed of the lamination body 1 slower than the winding speed (peripheral velocity) of the lamination body 1 to the shaping drum 11 from the time when the resin film protrusion portion 8 is sucked in advance by the sucking holes 19 of the shaping drum 11 to the time when the leading edge 5 of the unvulcanized rubber sheet 2 reaches the shaping drum 11. With this configuration, as is the case with the configuration described earlier, it is possible to prevent the occurrence of the winkles on the resin film protrusion portion 8 or removing the winkles even if the winkles occur, without displacing the supplying conveyor 12 so as to be spaced.

Incidentally, in the description above, it is preferable that the resin material of the resin film 3 contains at least a layer formed by resin composition in which a soft resin having a smaller Young's modulus at 23° C. than that of modified ethylene-vinyl alcohol copolymer obtained by reaction of ethylene-vinyl alcohol copolymer is dispersed in a matrix formed by the modified ethylene-vinyl alcohol copolymer. Further, it is preferable that one or more reinforcing layers formed by an elastomer and adjacent to the layer formed by the resin composition are provided. Yet further, it is preferable that a thickness of the layer formed by the resin composition is set to 100 µm or lower. Yet further, it is preferable that one or more adhesive layers are provided to at least one portion between the layer formed by the resin composition and the reinforcing layer, and between the reinforcing layer and a reinforcing layer.

Yet further, as the adhesive for adhering the resin film 3 to the unvulcanized rubber sheet 2, it is preferable to use an adhesive composition obtained by adding not less than 0.1 part by mass of at least one of maleimide derivative having two or more reaction sites in a molecule and poly-p-dinitrosobenzene to 100 parts by mass of a rubber component.

INDUSTRIAL APPLICABILITY

As described above, according to the present invention, it is possible to appropriately and easily wind the sheet lamination body around the shaping drum, by reliably positioning and retaining the winding-starting end of the sheet lamination body at the predetermined position on the outer peripheral surface of the shaping drum at the starting of winding the sheet lamination body formed by the resin film serving as the inner liner base material and the unvulcanized rubber sheet on the outer peripheral surface of the shaping drum in a manner that the resin film is located on the inner surface side.

EXPLANATION OF REFERENCE CHARACTERS

1 Sheet lamination body
2 Unvulcanized rubber sheet
3 Resin film
4 Leading edge of resin film
5 Leading edge of unvulcanized rubber sheet 6 Trailing edge of the resin film
7 Trailing edge of unvulcanized rubber sheet
8 Resin film protrusion portion
9 Unvulcanized rubber sheet protrusion portion
10 Tire manufacturing device
11 Shaping drum
12 Supplying conveyor
13 Resin film supplying drum
14 Lining sheet removing member
15 Lining sheet winding drum
16 Pressing roller
17 Film cutting means
19 Sucking hole

The invention claimed is:

1. A method for manufacturing a pneumatic tire including:
conveying, to a shaping drum by a supplying conveyor, a sheet lamination body formed by laminating an unvulcanized rubber sheet and a resin film having a gas barrier property, and winding the conveyed sheet lamination body in a position that the resin film is located on the inner side while causing an outer peripheral surface of the shaping drum to retain the conveyed sheet lamination body, wherein,
at the time of attaching the resin film on a surface of the unvulcanized rubber sheet, a resin film protrusion portion is formed by making a leading edge of the resin film protrude further toward a downstream side in a conveying direction than a leading edge of the unvulcanized rubber sheet as viewed in the conveying direction, and
the outer peripheral surface of the shaping drum is caused to retain in advance the resin film protrusion portion to wind the sheet lamination body on the outer peripheral surface of the shaping drum;
wherein, after the outer peripheral surface of the shaping drum is caused to retain the resin film protrusion portion, the supplying conveyor is moved so as to be slightly spaced from the shaping drum while operating so as to apply a constant tension to the resin film protrusion portion, whereby it is possible to adhere to the outer peripheral surface of the shaping drum without causing wrinkles in the resin film protrusion portion; and
wherein the protruding length of the resin film protrusion portion is set to ¼ or more of the outer peripheral length of a leading edge roller serving as a transferring portion of the lamination body by the supplying conveyor.

2. The method for manufacturing a pneumatic tire according to claim 1, wherein
the unvulcanized rubber sheet and the resin film each having an equal length along the conveying direction are employed, and
the leading edge of the resin film is positionally shifted to the downstream side in the conveying direction with respect to the leading edge of the unvulcanized rubber sheet as viewed in the conveying direction while a trailing edge of the resin film is positionally shifted to the downstream side in the conveying direction with respect to a trailing edge of the unvulcanized rubber sheet to form, in addition to the resin film protrusion portion, an unvulcanized rubber sheet protrusion portion in which the trailing edge of the unvulcanized rubber sheet protrudes further toward an upstream side in the conveying direction than the trailing edge of the resin film.

3. The method for manufacturing a pneumatic tire according to claim 1, wherein a winding-starting end of the sheet lamination body is brought close to the shaping drum before the outer peripheral surface of the shaping drum is caused to retain in advance the resin film protrusion portion.

* * * * *